United States Patent [19]

Wakamatsu et al.

[11] 3,737,887

[45] June 5, 1973

[54] PROTECTIVE DEVICE OPERATIVE UPON TRANSISTOR FAILURE

[75] Inventors: Hisato Wakamatsu, Kariya; Akira Kitano, Nagoya, both of Japan

[73] Assignee: Nippondenso Co., Ltd., Kariya-shi, Aichi-ken, Japan

[22] Filed: Nov. 26, 1971

[21] Appl. No.: 202,344

[30] Foreign Application Priority Data

Nov. 27, 1970 Japan ....45/104984
Dec. 4, 1970 Japan ....45/107847

[52] U.S. Cl.....340/248 E, 317/16, 324/158 T, 340/250, 340/255

[51] Int. Cl.....G08b 21/00, H02h 3/04

[58] Field of Search....340/248 E, 250, 253 E, 340/255; 317/16; 324/51, 158 T

[56] References Cited

UNITED STATES PATENTS

| | | | |
|---|---|---|---|
| 2,712,130 | 6/1955 | Sprague | 340/248 E |
| 3,046,480 | 7/1962 | Cummings et al. | 340/250 X |
| 3,119,104 | 1/1964 | Bryan | 340/248 E |
| 3,165,725 | 1/1965 | Kelcourse | 340/250 |
| 3,204,193 | 8/1965 | Rhyne, Jr. | 340/250 UX |
| 3,259,841 | 7/1966 | Proctor et al. | 324/51 X |
| 3,401,338 | 9/1968 | Bolvin | 324/158 T |

*Primary Examiner*—John W. Caldwell
*Assistant Examiner*—Daniel Myer
*Attorney*—Cushman, Darby & Cushman

[57] ABSTRACT

A protective device operative upon the failure of a transistor, which is designed such that when a short-circuit occurs between the collector and emitter of a transistor for controlling the supply of current to a load or when the lead connecting said load to the collector of said transistor is grounded directly connecting the load to the ground, the fault may be readily detected so that a fuse provided between the load and a power source is caused to blow and a warning means such as a lamp is caused to give warning to the operator about the occurrence of the fault and at the same time the supply of current to the load is forcibly interrupted, thereby eliminating various defects that would be otherwise caused by any unnecessary supply of current to the load.

2 Claims, 3 Drawing Figures

PROTECTIVE DEVICE OPERATIVE UPON TRANSISTOR FAILURE

BACKGROUND OF THE INVENTION

1. Field of the Invention

The present invention relates generally to protective devices which are operative upon the failure of transistors and more particularly to a protective device which is designed to operate upon the failure of a transistor adapted for example to supply current to a load installed in an automotive vehicle, such that when a fault occurs causing for example a short-circuit between the collector and emitter of the transistor and thus unnecessarily permitting the continued supply of current to the load, the fault may be readily detected to forcibly interrupt the current supply to the load.

2. Description of the Prior Art

A conventional device of the above type is shown in FIG. 1 in which a load 1 is provided between the collector of an actuating transistor 2 and the positive terminal of a storage battery 3. When no input signal is applied to the base of the transistor 2 or to an input terminal 4, the transistor 2 is cut off supplying no current to the load 1, whereas when a positive input signal is applied to the input terminal 4, the transistor 2 is conducted thus supplying current to the load 1.

With the conventional device described above, however, there is a defect in that if the transistor 2 is damaged so that a short circuit occurs between the collector and emitter thereof, an excessive current will be supplied to the load 1 even though there is no input signal being applied to the input terminal 4 and the similar thing will occur if the lead connecting the load 1 to the collector of the transistor 2 is grounded and thus the load 1 is directly connected to the ground. Thus, if for example, the load 1 constitutes a solenoid coil for actuating the servo means to reduce the braking pressure as used in one of those vehicle wheel anti-locking systems which have recently been under development, i.e., the one which is designed to detect the wheels on the point of locking and thus forcibly reduce the braking pressure applied to the wheels thereby preventing the locking of the wheels under an excessively large braking pressure applied upon a braking operation in excess of the limit allowable according to the friction coefficient between the wheel and the road surface, the occurrence of such a fault is very dangerous because, if the solenoid coil is continuously energized as a result of the fault, the braking pressure will be continuously reduced even if the driver manipulates in a manner to reapply the braking pressure to the wheel, thus leading to such accidents as a collision from behind or a head-on collision.

SUMMARY OF THE INVENTION

It is an object of the present invention to provide, in order to solve the foregoing difficulty, a protective device which is operative upon the failure of a transistor such that when a short-circuit occurs between the collector and emitter of a transistor for controlling the supply of current to a load or when the lead connecting said load to said transistor collector is grounded thus directly connecting said load to the ground, the fault is readily detected so that a fuse provided between the load and a power source is caused to blow and thus the supply of current to the load is forcibly interrupted, thereby preventing the occurrence of various defects due to the unnecessary current supply to the load.

It is another object of the present invention to provide a protective device operative upon the failure of a transistor comprising an actuating transistor 2 having the collector thereof connected to a load 1, a drive transistor 8 for conducting said actuating transistor upon receipt of an input signal, a reversing transistor 5 adapted to be forward-biased to become conductive only when said drive transistor 8 is in the non-conduction state with no input signal being applied thereto and at the same time there exists a short-circuit between the collector and emitter of said actuating transistor 2 or said load 1 is directly connected to ground, and a fuse 7 connected among a power source, said load 1 and the collector of said reversing transistor 5.

According to the present invention, there is a remarkable effect in that when a short-circuit occurs between the collector and emitter of the actuating transistor or when the load is directly connected to ground, the reversing transistor is conducted so that the fuse is blown in an instant by a large current flowing through the reversing transistor between the collector and emitter thereof and thus the supply of current to the load is forcibly interrupted, thereby entirely preventing the occurrence of various defects due to the unnecessary current supply to the load.

There is a further remarkable effect in that a carefully thought out fail safe design is ensured such that the fuse may be similarly blown when a short-circuit occurs between the collector and emitter of the reversing transistor and thus the user of the device can employ it with a sense of security and without entertaining any apprehension.

Moreover, since the circuit construction of the present invention requires only two additional transistors and a fuse as compared with the conventional circuit shown in FIG. 1, the device of the present invention requires a fewer number of additional components, is simple in construction and can be produced economically and thus, when coupled with the previously mentioned effects, the practical effect of the present invention is exceedingly remarkable.

According to the present invention, there is a still further remarkable effect in that since there is further provided a transistor which is designed to detect the collector potential of the reversing transistor so as to actuate a warning means, the occurrence of a fault causing a short-circuit between the collector and emitter of the actuating transistor or directly connecting the load to the ground can be easily and readily detected in terms of a variation in the collector potential of the reversing transistor to cause the warning means to give a warning to the operator about the fault. In this way, the operator is not required to pay attention to the operating conditions of the load in response to the input signal and the occurrence of that kind of faults as previously mentioned can be readily observed by means of the existence or non-existence of a warning given by the warning means.

DESCRIPTION OF THE PREFERRED EMBODIMENTS

Figure 1:
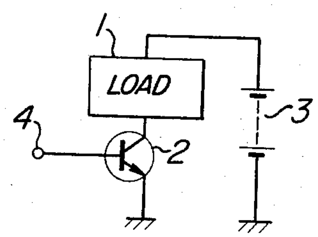
FIG. 1 PRIOR ART
FIG. 1 is an electrical wiring diagram showing the circuit of a conventional device in which the load is actuated by means of a transistor.
Figure 2:
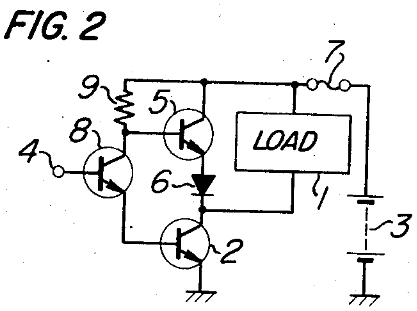
FIG. 2 is an electrical wiring diagram showing an embodiment of the protective device of the present invention which is operative upon the failure of a transistor.

The present invention will now be explained with reference to a first embodiment illustrated in FIG. 2. In FIG. 2, the identical reference numerals as used in FIG. 1 designate the identical parts or the equivalents thereof, and numeral 5 designates a reversing transistor having its emitter connected to the collector of an actuating transistor 2 through a potential regulating diode 6 thus connecting the reversing transistor 5 in parallel with a load 1, with both the collector of the reversing transistor 5 and one terminal of the load 1 on its power supply side being connected to the positive terminal of a storage battery 3 through a fuse 7. Numeral 8 designates a drive transistor having its base connected to an input terminal 4, its emitter connected to the base of the actuating transistor 2 and its collector connected to the base of the reversing transistor 5. Numeral 9 designates a resistor connected between the collector and base of the reversing transistor 5.

With the construction described above, the operation of the device of this embodiment will now be explained. When a positive input signal is applied to the input terminal 4, the drive transistor 8 is rendered conductive and at the same time the actuating transistor 2 is also rendered conductive, thereby causing the flow of current from the battery 3 to the load 1 through the fuse 7. At this time, the reversing transistor 5 is in its non-conductive condition. On the other hand, when no input signal is applied to the input terminal 4, all the transistors 8, 2 and 5 are rendered non-conductive, thereby supplying no current to the load 1.

Assuming now that there is a short-circuit between the collector and emitter of the actuating transistor 2, if an input signal is applied to the input terminal 4, the drive transistor 8 is rendered conductive and the reversing transistor 5 is rendered non-conductive. Consequently, current flows from the battery 3 to the load 1 through the fuse 7 and the actuating transistor 2 having the short-circuit between the collector and emitter thereof. In this state, when there is no longer any input signal applied to the input terminal 4, the drive transistor 8 is rendered non-conductive and the reversing transistor 5 is biased in the forward direction by the resistor 9 thus becoming conductive. When this happens, the fuse 7 is blown in an instant by a large current flowing through the collector and emitter side of the reversing transistor 5 and the diode 6 and through the collector and emitter side of the actuating transistor 2. This results in a forced interruption of the current supply to the load 1. Although in this case a large current of the order of 3 amperes, for example, flows through the reversing transistor 5, there is no danger of the transistor 5 breaking down since such a large current flows only for a very short period of time, and this has been proved to be true by the tests conducted by the inventors. The operation described also takes place when the lead connecting the load 1 to the collector of the actuating transistor 2 is grounded and the load 1 is thus connected directly to the ground, so that the fuse 7 is blown in the similar manner thereby forcibly interrupting the supply of current to the load 1.

On the other hand, assuming there is a short-circuit between the collector and emitter of the reversing transistor 5, if the actuating transistor 2 is rendered conductive, a large current flowing between its collector and emitter causes the fuse 7 to blow thus forcibly interrupting the supply of current to the load 1.

It should be noted here that the load 1 in the device of this embodiment may take the form of various kinds of means. For example, it may be a solenoid coil for actuating pressure reducing servo means such as employed in the previously mentioned vehicle wheel antilocking devices or it may be a solenoid coil for actuating the throttle valve of a vehicle engine such as employed in the vehicle automatic speed control systems. In either of the tow forms of the load 1, the vehicle can be prevented from running away due to the continued releasing of the braking pressure or the continued supply of fuel to the vehicle engine which would be caused when the solenoid coil is excessively energized.

Next, the construction and operation of a second embodiment of the present invention illustrated in FIG. 3 will be explained. The second embodiment differs from the first embodiment in that there are further provided a transistor 10, a resistor 11, a lamp 12 and a resistor 13. Thus, the elements which are identical with those of the first embodiment will not be explained.

Figure 3:
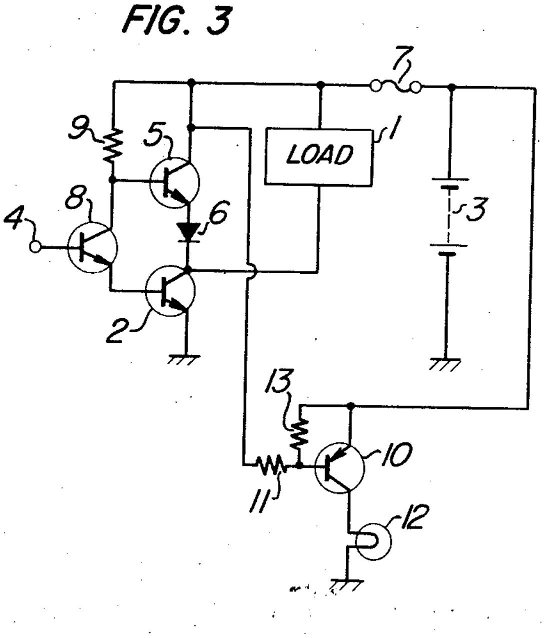
FIG. 3 is an electrical wiring diagram of another embodiment of the protective device according to the present invention.

In the FIG. 3, the transistor 10 has its base connected to the collector of the reversing transistor 5 through the resistor 11, its emitter connected to the positive terminal of the battery 3 and its collector is grounded through a lamp 12 constituting a warning means. The resistor 13 is connected between the emitter and base of the transistor 10.

Either when a positive input signal is applied to the input terminal 4 or when no positive input signal is applied to the input terminal 4, the reversing transistor 5 is rendered non-conductive making its collector potential substantially equal to the supply voltage of the battery 3 and the transistor 10 is also rendered non-conductive, thereby causing the lamp 12 to go off.

When there is no longer any input signal applied to the input terminal 4, the drive transistor 8 is rendered non-conductive so that the reversing transistor 5 is biased in the forward direction by the resistor 9 thus becoming conductive. When this happens, the fuse 7 is blown instantaneously by a large current flowing through the collector and emitter side of the reversing transistor 5 and the diode 6 and through the collector and emitter side of the actuating transistor 2. This forcibly interrupts the supply of current to the load 1. On the other hand, at the time that the reversing transistor 5 is rendered conductive, its collector potential is reduced substantially to the zero potential and thus the transistor 10 is rendered conductive so that current is supplied to the lamp 12 and the lamp 12 is thus lit, thereby promptly giving a warning to the operator about the occurrence of the fault.

The operation described also takes place when the lead connecting the load 1 to the actuating transistor 2 is grounded thus directly connecting the load 1 to the ground, so that the fuse 7 is blown in the similar manner and hence the supply of current to the load 1 is forcibly interrupted and at the same time the transistor 10 is rendered conductive lighting the lamp 12 and thus giving a warning to the operator.

In the event that there is a short-circuit between the collector and emitter of the reversing transistor 5, if the actuating transistor 2 is rendered conductive, the fuse 7 is blown by a large current flowing through the collector and emitter side of the transistor 2 thus forcibly interrupting the supply of current to the load 1 and at the same time the transistor 10 is rendered conductive causing the lamp 12 to go on and thus giving a warning to the operator about the occurrence of the fault.

It is also a matter of course that in addition to the lamp 12 employed in the second embodiment by way of example, the warning means may comprise a buzzer or the like.

We claim:

1. A protective device operative upon the failure of a transistor: comprising an actuating transistor (2) having the collector thereof connected to a loads (1); a drive transistor (8) for conducting said actuating transistor (2) upon receipt of an input signal; a reversing transistor (5) adapted to be biased in the forward direction so as to be rendered conductive only when said drive transistor (8) is in the non-conduction state with no input signal being applied thereto and at the same time there is a short-circuit between the collector and emitter of said actuating transistor (2) or said load (1) is directly connected to the ground; and a fuse (7) connected to a power source, said load (1) and the collector of said reversing transistor (5).

2. A protective device operative upon the failure of a transistor according to claim 1, wherein there is further provided a transistor (10) for detecting the collector potential of said reversing transistor (5) to actuate a warning means (12).

* * * * *